Sept. 7, 1926.  
R. RUMMLER  
1,599,032  
DRIVE MECHANISM FOR ACCOUNTING MACHINES  
Filed Jan. 5, 1924   3 Sheets-Sheet 1

Witness  
Martin H. Olsen.

Inventor  
Rudow Rummler

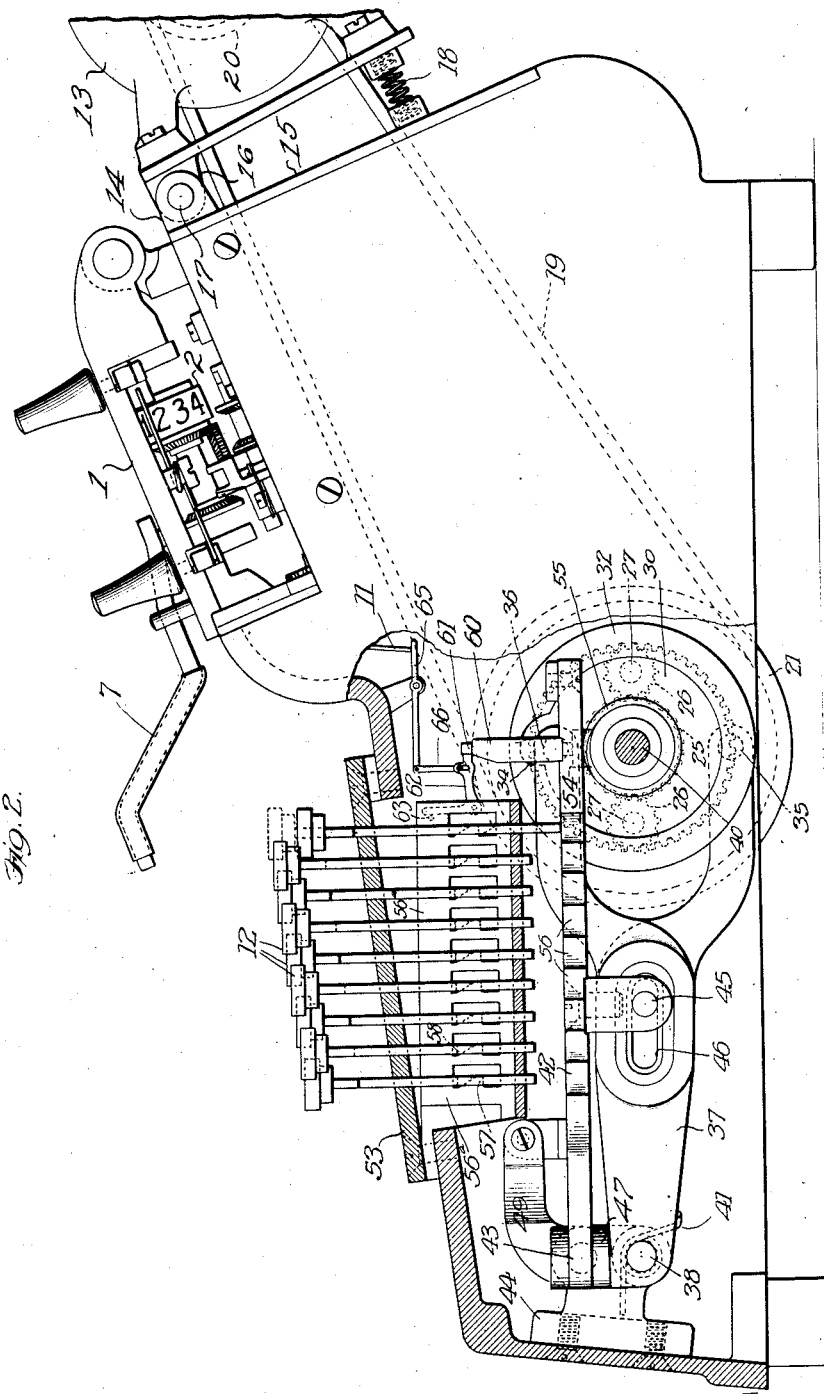

Sept. 7, 1926.
R. RUMMLER
1,599,032
DRIVE MECHANISM FOR ACCOUNTING MACHINES
Filed Jan. 5, 1924
3 Sheets-Sheet 3
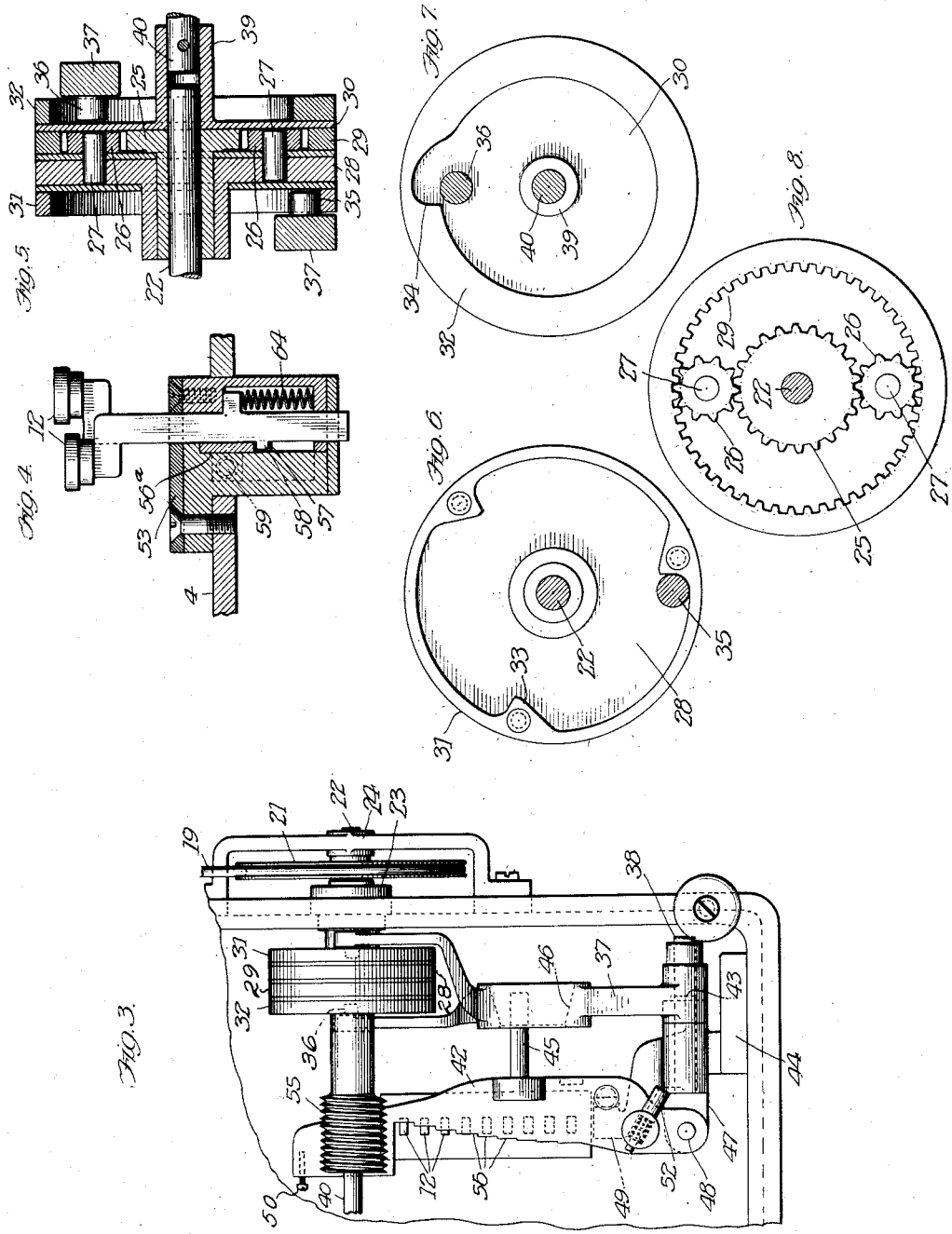

Patented Sept. 7, 1926.

1,599,032

UNITED STATES PATENT OFFICE.

RUDOW RUMMLER, OF CHICAGO, ILLINOIS.

DRIVE MECHANISM FOR ACCOUNTING MACHINES.

Application filed January 5, 1924. Serial No. 684,627.

This invention relates to motor drive attachments for accounting machines. The drive shaft of such machines, as, for instance, the one herein illustrated, designated as 8, are often provided with a crank by means of which the necessary power for operating the machine is transmitted to the mechanism as controlled by the numeral keys of the key board. Therefore, after the proper keys are depressed, the operator, by means of the crank on the main drive shaft, imparts a single rotation or oscillation of the shaft in order to add to or subtract from the totalizer the amount represented by depressed keys, except in the case of multiplication or division wherein the operation of the crank is continuously repeated a number of times according to the number of times it is desired to multiply the amount represented by depressed keys or divide the quantity indicated on the totalizer by this amount. The construction to which this application for patent is directed is an improved motor drive mechanism which may be controlled to operate a drive shaft either once or a plurality of times in succession as required in multiplying and dividing operations. The utility of the device is mainly to avoid the necessity of an operator counting the number of times he operates the crank handle of a machine in a multiplying or dividing operation and also to effect these repeat operations with far greater rapidity and with a more uniform application of power.

The mechanism herein described is capable of numerous applications to accounting machines such as calculators, listing machines, cash registers, and even other mechanisms of a different class wherein it is desired to drive said mechanisms different definite extents or to drive different parts of such mechanisms different definite extents. The construction is herein illustrated as a drive mechanism for a well-known type of calculating machine, known in the United States market as the Doty record or Lindstrom machine. This machine is key-controlled and usually crank-operated, and the main set of numeral wheels is mounted upon a denominationally shiftable carriage in order to facilitate operations of multiplication and division.

The purpose of the present invention is to speed up the operation of the machine, particularly during multiplying and dividing operations by providing a suitable motor drive for operating the main drive shaft any different desired definite amounts and thus relieve the operator of unnecessary manual operation of the driving mechanism, and incidentally eliminate the uncertainties, irregular action, and errors of manual operation.

In order to accomplish this purpose of the invention in a highly practicable way without the use of the usual clutch between the motor and the driven mechanism and do away with complicated mechanism for producing a differential motion of the driven mechanism, the present design has as its basis the use of any one of the simple and well-known differential gearings. The differential gearing may be either of the bevel spur or eccentric gear type, but as herein shown is preferably a simple epicyclic gearing including one internal and one external gear connected together by intermediate pinions. One of the gears is fast to the driven shaft. Thus, if the driven shaft is locked while the motor is rotating the intermediate pinions merely idly revolve around the stopped gear. To effect any desired number of revolutions of the driven shaft it is only necessary to release the shaft and at the same time stop the revolution of the idle pinions and permit their rotation around their axes only.

Part of the mechanism employed in the construction herein described is covered by applicant's Patent No. 1,230,928, cash register, June 26, 1917. In the patent key-controlled differential gearing is shown as the main accounting mechanism of the machine. In the present case key-controlled differential gearing is utilized in a motor drive mechanism for the calculating machine. The particular calculating machine shown, like many others to which the present construction may be applied, has a main drive shaft, which, in operations of the machine, must be given variable numbers of rotations. except for operations of addition and subtraction, when numbers are entered in the totalizer merely by a single rotation of the drive shaft. When this drive mechanism is applied to calculating machines having an oscillating drive shaft, such as ten-key machine like the Dalton or Sundstrand, an eccentric and pitman are preferably employed to convert the rotary motion of the driving mechanism to the oscillating motion required for the drive shaft of the machine.

In the drawings:—

Fig. 2 is a longitudinal sectional view taken on the line 2—2 of Fig. 1.

Fig. 3 is a bottom plan view of the driving mechanism for the machine.

Fig. 4 is a sectional detail of the multiplying keyboard.

Fig. 5 is a transverse sectional view of differential gearing employed in the driving mechanism.

Figs. 6 and 7 are face views of stop elements of the differential gearing.

Fig. 8 is a detail illustrating a preferred arrangement of gears in the differential gearing.

Figure 1:
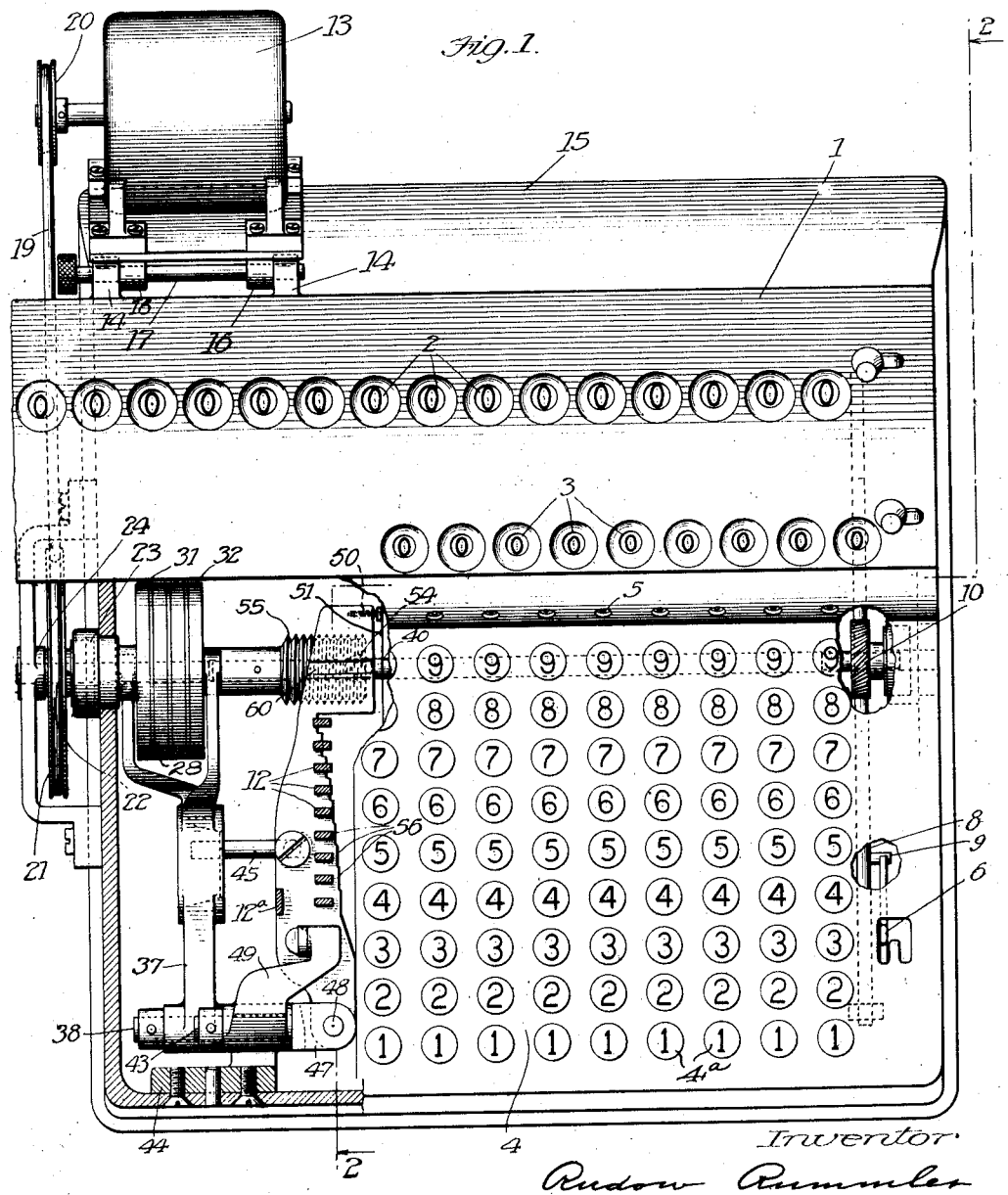
Figure 1 is a plan view of a calculating machine with the casing partly broken away to show the new mechanism as applied thereto.

The Lindstrom calculating machine as indicated in the drawings includes a numeral wheel supporting carriage 1, which carriage has a lateral movement with respect to the operating mechanism for the numeral wheels so as to provide for the necessary denominational shift of the carriage in multiplying or dividing operations. The carriage 1 is provided with two sets of numeral wheels 2 and 3, the set 2 serving to indicate the sum of additions or the number which is a result of multiplying operations, or a number which it is desired to divide by another number. The numeral wheels 3 serve to indicate how many times a number represented by depressed keys on the keyboard 4 has been divided into the number originally represented by the wheels 2, or added to such number. The number represented by depressed keys 4ª is indicated through the sight apertures 5, immediately above the banks of keys. The key release lever is indicated at 6. The carriage 1 may be given its denominational adjustment by lever 7, and the direction of rotation of numeral wheels 2 is also determined by an adjustment of this lever. The main drive shaft 8 of the calculating machine carries a pin 9, which serves to operate the key release lever 6 after each rotation of the drive shaft when this lever is in the adding and subtracting position.

The drawings show the calculating machine in outline, but do not illustrate the old part of the operating mechanism therefor since the present invention relates to the driving mechanism which may be combined with the calculating machine without altering the operating mechanism. The only connection that the driving mechanism need have with the old parts of the machine is the gear connection 10 with the main drive shaft 8, although one other connection, namely the link 11, Fig. 2, is sometimes provided. The purpose of the last-named connection is to release a depressed multiplying key 12, which is part of the driving unit, when the higher order wheels of the totalizer pass from zero to nine on dividing operations. Accordingly, when it is attempted to divide a number shown by wheels 2 by another number, more times than the latter will go into the former number, the machine is automatically stopped when the totalizer goes beyond its zero reading to the point where it indicates the complement of the remainder.

The plurality of banks of amount determining keys 4ª are distinct from the set of multiplying or dividing keys 12 forming a separate bank, and control separate differential mechanism. The multiplier or divider indicating wheels 3 each serve to count and indicate the number of revolutions of drive shaft 8 or operations of the machine, while the carriage 1 is in corresponding denominational positions. Multiplying or dividing numbers, determined by successive depression of keys 12, accordingly appear on the indicating wheels 3 after operations of the machine. The particular mechanism for operating any of the indicating wheels is not illustrated, as the present improvements are confined to a machine driving mechanism under the control of keys 12.

The driving mechanism includes an electric motor 13, detachably secured to lugs 14 on the back plate 15 of the casing for the machine. The base of the motor 13 is provided with lugs 16, through which and the lugs 14 is passed a pin 17. By this means the motor has a hinged connection with the frame of the machine, and its lower end bears against a spring 18, which spring serves to keep the belt 19 under the desired tension. The belt 19 connects the motor pulley 20 with a pulley 21, fast to a short shaft 22, Figs. 1 and 5. This shaft is supported in ball bearings 23 and 24 at each side of the pulley 21. A small gear 25 is secured to the inner end of shaft 22, and this gear meshes with a pair of pinions 26, which are carried by studs 27 projecting from the side of a disk 28. The pinions 26 also mesh with an internal gear 29, secured to a disk 30. By this arrangement rotation of the gear 25 may be communicated to the disk 28 by restraining or stopping rotation of gear 29, since then the pinions 26 are compelled to roll on the internal gear, or rotation of gear 25 may be communicated to the internal gear 29 by preventing rotation of disk 28, and pinions 26 are then compelled to rotate on fixed axes. For the purpose of preventing rotation of either disk 28 or the disk 30 and the internal gear attached thereto, the disks 28 and 30 respectively carry stop elements 31 and 32. Due to the gear ratio employed, the stop member 31 is provided with three shoulders 33, while the stop member 32 is provided with but one shoulder 34. These shoulders cooperate with pins 35 and 36 carried by a pivoted forked latching member or stop 37. The pins 35 and 36 therefore move together when the latching member 37 is rocked on its pivotal support 38. Pins 35 and 36 are so located with reference to the shoulders 33 and 34 so that when one shoulder is engaged the other will be released. The disk 30 has a hub 39 into which shaft 22 extends, and the disk 30 may freely rotate upon this shaft. A transverse coaxial shaft 40 also extends into hub 39, to which it is pinned. The shaft 40, as shown in Fig. 1, has a gear connection 10 with the main drive shaft 8.

Normally the pin 36, Fig. 7, is engaged by the shoulder 34, and the pin 35, Fig. 6, is free of the shoulders 33. This results in the motor 13 normally idly driving the disk 28, since the pinions 26 are then compelled to roll upon the internal gear 29. When the forked latching member 37 is depressed from its normal position, pin 36 is disengaged from shoulder 34 while pin 35 comes into the path of one of the shoulders 33. In this manner disk 28 is stopped, while disk 30 is freed for rotation, and the latter is driven due to the rotation of pinions 26 on their axes. Shaft 40, which is pinned to the disk 30, rotates and drives the drive shaft 8. The extent of rotation of the drive shaft 8, and thus the number of times an amount represented by depressed keys 4 is added to or subtracted from the numeral wheels 2, is determined by how long the latch element 37 is held in its lower position. If a number represented on the keyboard is to be added into the totalizer but once, the latching element 37 is held in its lower position only long enough to permit one rotation of disk 30. If the disk 30 is permitted to rotate a greater number of times, the number on the keyboard will be added to or subtracted from the totalizer or numeral wheels 2 such greater number of times. The latching element 37 is normally urged to rock upwardly by the spring 41, but the motion of this latching element either in a downward or upward direction is controlled by a stepped plate 42. Plate 42 is pivotally mounted on a short shaft 43, supported in a bracket 44, which likewise supports the shaft 38 upon which the member 37 is pivoted. Plate 42 carries a pin 45 projecting through a slot 46 in the latching member 37. The short shaft 43 supporting plate 42 has a slotted head 47, to which the plate 42 is pivoted by the vertically extending pin 48. Plate 42 may, therefore, rock in a transverse direction around pin 48, as well as in a vertical direction around its pivotal support in the bracket 44. When the plate 42 is rocked upward or downward it carries with it the latching member 37, but the plate 42 may swing laterally independently of the latching element 37. The sidewise motion of the plate 42 is limited by a stop 49 on bracket 44, and by an adjustable screw 50 carried by the plate, the head of which screw engages a frame member 51 of the calculating machine. The plate 42 is normally held in its zero position with the screw 50 engaging the frame member 51 by a spring-pressed plunger 52, Fig. 3, bearing against the bracket 44.

A keyboard 53, supporting the multiplying keys 12, is located above the plate 42, and any one of these keys when depressed engages the upper surface of plate 42, rocking it downwardly, and thus through the pin 45 on the plate causing the latching element 37 to release disk 30 and latch disk 28 against further rotation. The calculating machine is then driven until the multiplying key is released and the latching element 37 may return to its normal position. When the plate is moved downwardly under the action of one of the multiplying or dividing keys 12, a tooth 54, swivelled on plate 42, engages a worm or thread 55 on shaft 40. This worm then serves to swing the plate 42 to the left around its pivot 48 until one of the steps 56 clears the depressed key when the plate and the latching member 37 rock upwardly under the action of spring 41. Tooth 54 is thus disengaged from worm 55, and the latching element 37 engages the shoulder 34, Fig. 7, stopping the drive shaft 40 and the machine operated thereby in its home position, while at the same time freeing the disk 28 by becoming disengaged from one of its shoulders 33.

The depressed key 12 is retained in its depressed position by a key detent 56$^a$ Figs. 2 and 4. This detent, as shown, has inclined shoulders 57 for engaging projections 58 formed on the keys. Accordingly, when a key is depressed detent 56$^a$ is pushed to one side against the action of its spring 59 until a lug 58 passes below the shoulder on the detent when the detent moves rearwardly far enough to catch the key and hold it in its depressed position. When the plate 42 passes clear of the depressed key and rises, a bracket 60 on one end of the plate engages a roller 61 on a bell crank lever 62, pivoted to the frame of the keyboard 53. This bell crank lever in turn engages a pin 63 on the detent 56, and disengages the detent from the depressed key, which key then rises to its normal position under the action of its spring 64, Fig. 4.

Sometimes in extracting the square root of a number, or in other dividing operations, it is desired to release a depressed key before the plate 42 passes clear of the key. For this reason the link connection 11, Fig. 2 is provided between the bell crank lever 62 and preferably the bell hammer mechanism usually provided in the class of machine illustrated. This bell hammer mechanism operates when higher order numeral wheels of the main totalizer pass from zero to nine which occurs upon an attempt to subtract a greater from a lesser number. When the link 11 is depressed upon such movement of the higher order totalizer wheels, it rocks a lever 65, one end of which is connected by a link 66 with the bell crank lever 62. It accordingly operates the bell crank lever to release the depressed key. Link 66 has a slot and pin connection with the lever 62 in order not to interfere with its normal operation. This release of a key 12 upon an over-subtraction is not always desired, and, therefore, means are provided for rendering this mechanism ineffective merely by detaching the link 11 from lever 65. This is done by rocking the link 11 rearwardly so that its foot does not engage lever 65.

The various operations which may be performed by the machine illustrated in the drawing are numerous and well understood by many operators of this type of machine. The new driving mechanism attached to the machine relieves the operator of the necessity of manually operating a crank on drive shaft 8. With the motor running constantly, disk 28 is normally idly driven, as previously explained, but when one of the multiplying or dividing keys 12 is depressed this disk is stopped, and then serves as a fixed support for the pinions 26, compelling these pinions during their rotation to drive internal gear 29, and consequently the shaft 40 and drive shaft 8. If a number represented by depressed keys on keyboard 4 is to be entered in the totalizer or indicating wheels 2 but once, the "one" key at the rear end of keyboard 52 is depressed. If it is desired to turn the number in a greater number of times, one of the keys 12 of higher value is depressed. Whether the number is added or subtracted is determined by the setting of lever 7, Fig. 2. This lever serves to position reverse gears for the totalizer 2. If one number is to be divided into another or multiplied by another a greater number than nine times, the proper keys 12 are depressed in succession, the denominational shift of the carriage 1 being taken care of between the depressions of the keys 12. It should be noted that the shoulder 34 of Fig. 7 serves as a machine stop, and that this shoulder is at one side of the recess in the member 32. The circular inner surface of the member 32 thus serves to hold the latch 37 down until the recess in member 32 arrives opposite the pin 36, even though, due to inaccuracies of construction, the plate 42 may have cleared the depressed key two or three hundred degrees rotation of shaft 40 prior to the shoulder 34 arriving near the pin 36. The function of plate 42 is to hold the latch 37 down while the shaft 40 rotates at least over a number of times less by one than that actually represented by the depressed key 12.

I claim:—

1. A machine of the class described comprising an accounting mechanism, a motor for driving said mechanism, differential gearing between said motor and accounting mechanism, a latching element for said differential gearing arranged for controlling the effectiveness of said motor with respect to said accounting mechanism, an oscillatory stepped plate for controlling the operation of said latching element, and a manipulative device cooperating with the steps on said plate for regulating the operation of said latch.

2. A machine of the class described comprising an accounting mechanism, a motor for driving said mechanism, differential gearing between said motor and accounting mechanism, a latching element for said differential gearing and arranged for controlling the effectiveness of said motor with respect to said accounting mechanism, an oscillatory stepped plate for controlling the operation of said latch, a manipulative device cooperating with the steps on said plate, and means for driving said plate in predetermined relationship with the operation of said accounting mechanism.

3. In an accounting machine, a driven accounting element, means for driving said element comprising a motor, a screw driven by said motor, a differentially movable member adapted to be operatively connected with said screw, manipulative means for determining the period said member is driven by said screw, said differentially movable member being arranged to control the operation of said accounting element.

4. In an accounting machine, a driven accounting element, means for driving said element comprising a motor, a screw driven by said motor, a differentially movable member adapted to be operatively connected with said screw, said differentially movable member being arranged to control the operation of said accounting element.

5. A mechanism of the class described comprising differential gears, means for stopping or releasing one of said gears at definite points with respect to its rotation, a variably movable member for controlling said means, a screw for driving said movable member, and a manually operated device for regulating the extent of movement of said member.

6. A mechanism of the class described comprising differential gears, means for stopping or releasing one of said gears at definite points with respect to its rotation, a variably movable member for controlling said means, and a screw for driving said movable member.

Signed at Chicago this 2nd day of January, 1924.

RUDOW RUMMLER.